US 8,817,375 B2

(12) United States Patent
Motoike et al.

(10) Patent No.: US 8,817,375 B2
(45) Date of Patent: Aug. 26, 2014

(54) CORRECTION-LENS-MOVING VOICE COIL MOTOR, ANTI-VIBRATION DEVICE, INTERCHANGEABLE LENS UNIT AND OPTICAL APPARATUS

(75) Inventors: Takashi Motoike, Fukaya (JP); Hiroyuki Ooara, Machida (JP); Yoshihiko Kuriyama, Takasaki (JP)

(73) Assignee: Kenko Tokina Co., Ltd., Tokyo (JP)

( * ) Notice: Subject to any disclaimer, the term of this patent is extended or adjusted under 35 U.S.C. 154(b) by 226 days.

(21) Appl. No.: 13/145,946

(22) PCT Filed: Jan. 22, 2010

(86) PCT No.: PCT/JP2010/050832
§ 371 (c)(1),
(2), (4) Date: Jul. 22, 2011

(87) PCT Pub. No.: WO2010/084965
PCT Pub. Date: Jul. 29, 2010

(65) Prior Publication Data
US 2011/0279899 A1   Nov. 17, 2011

(30) Foreign Application Priority Data

Jan. 23, 2009  (JP) ................................. 2009-012726

(51) Int. Cl.
*G02B 27/64*   (2006.01)
*G02B 7/02*   (2006.01)

(52) U.S. Cl.
CPC ............... *G02B 27/646* (2013.01); *G02B 7/02* (2013.01); *G02B 27/64* (2013.01)
USPC .......................................... 359/554; 359/811

(58) Field of Classification Search
CPC .... G02B 27/646; G02B 27/644; G02B 27/64; G02B 15/173; H04N 5/23258; H04N 5/23248; H04N 5/232; H04N 5/23254; H04N 5/23267; H04N 5/23287; H04N 5/23264; G03B 2217/005; G03B 2205/0007; G03B 5/00; G03B 17/56; H01F 3/00; H01F 3/14; H01F 7/14; H01F 7/06; H01F 7/066; H01F 5/00; H01F 5/02; H01F 5/04; F16M 13/04; G01P 15/135; G01R 33/3806; G01R 33/381; G01R 33/383; H01H 51/20; H01H 50/88; H01J 29/762; H01J 29/764
See application file for complete search history.

(56) References Cited

U.S. PATENT DOCUMENTS

| 5,805,937 | A  | * | 9/1998 | Kitagawa | ........................ 396/55 |
| 2003/0020578 | A1 | * | 1/2003 | Aoki et al. | .................... 335/299 |
| 2003/0218391 | A1 | * | 11/2003 | Hirata | .............................. 310/12 |

(Continued)

FOREIGN PATENT DOCUMENTS

| JP | 2641172 B2 | 8/1997 |
| JP | 2006-094185 A | 4/2006 |

(Continued)

*Primary Examiner* — Stephone B Allen
*Assistant Examiner* — Jyotsna Dabbi
(74) *Attorney, Agent, or Firm* — Sughrue Mion, PLLC

(57) ABSTRACT

A voice coil motor for moving a correction lens including a magnet unit having a pair of yokes and at least one permanent magnet for defining a magnetic gap, and a coil disposed in the magnetic gap. The permanent magnet having different magnetic poles adjacent to each other along the movement direction on a surface opposing the magnetic gap; the width of the permanent magnet in the movement direction being two times the width Wm of the magnetic poles; the width Wa of the coil in the movement direction being smaller than the width 2Wm of the permanent magnet; and the effective conductor width Wb of the coil, the magnetic pole width Wm of the permanent magnet and the longest movement distance St of the correction lens meeting the conditions of $Wm=(Wb+St)\times K$, wherein K is a constant meeting $1<K\leq 1.5$.

3 Claims, 8 Drawing Sheets

(56) References Cited

U.S. PATENT DOCUMENTS

| | | |
|---|---|---|
| 2004/0136704 A1* | 7/2004 | Usui .............................. 396/55 |
| 2006/0064884 A1 | 3/2006 | Seo |
| 2008/0231997 A1* | 9/2008 | Yamada et al. ............ 360/294.5 |

FOREIGN PATENT DOCUMENTS

| | | |
|---|---|---|
| JP | 2008-209434 A | 9/2008 |
| JP | 2008-263769 A | 10/2008 |
| JP | 4181663 B2 | 11/2008 |

* cited by examiner

CORRECTION-LENS-MOVING VOICE COIL MOTOR, ANTI-VIBRATION DEVICE, INTERCHANGEABLE LENS UNIT AND OPTICAL APPARATUS

CROSS REFERENCE TO RELATED APPLICATIONS

This application is a National Stage of International Application No. PCT/JP2010/050832, filed Jan. 22, 2010, which claims priority from Japanese Patent Application No. 2009-012726, filed Jan. 23, 2009, the contents of all of which are incorporated herein by reference in their entirety.

FIELD OF THE INVENTION

The present invention relates to a voice coil motor for moving a lens for correcting the blurring of image due to hand movement, etc. in optical apparatuses such as cameras, binoculars, etc., an anti-vibration device driven by the voice coil motor, and an interchangeable lens unit and an optical apparatus comprising the anti-vibration device.

BACKGROUND OF THE INVENTION

In optical apparatuses such as digital still cameras, as the number of pixels and the magnification of zooming increase, the blurring of image due to hand vibration (including tremble of hands in addition to the sway of arms or a body) while photographing increases. To prevent it, the optical apparatuses have become comprising anti-vibration devices. The anti-vibration device is an apparatus for moving image to the right position on an image sensor such as CCD, etc. depending on hand movement detected while photographing.

The anti-vibration device mainly uses an image-sensor-shifting system (for example, CCD-shifting system) or a lens-shifting system. The image-sensor-shifting system is a system of shifting an image sensor (CCD) based on hand movement detected by a vibration-detecting sensor such as a gyro sensor, etc. to correct image blur. The lens-shifting system is a system of shifting a correction lens contained in a barrel comprising imaging lenses vertically and horizontally in a plane perpendicular to an optical axis of the imaging lenses by a very small distance (several millimeters or less) determined by vibration detected by a vibration-detecting sensor, to change the refraction of light, thereby correcting image blur. The terms "hand vibration" and "image blur" are sometimes used for the same meaning, but only the term "hand vibration" is used herein to avoid confusion.

The correction of hand vibration by the image-sensor-shifting system, which need not shift the optical system, is more advantageous than the lens-shifting system for miniaturization, so that it is mainly used in compact-sized (portable) digital cameras. On the other hand, the correction of hand vibration by the lens-shifting system is excellent in the function of correcting hand vibration but disadvantageous in miniaturization, so that it is mainly used in interchangeable lens units for digital, single-lens reflex cameras and digital video cameras. Although the lens-shifting system can theoretically completely correct hand movement, it needs the high-precision shifting of a correction lens in a plane perpendicular to the optical axis of the imaging lenses.

Electric power consumption by a digital camera, etc. is not constant but increases temporarily when photographing (releasing a shutter), when storing data in a memory card, etc., followed by drastic voltage drop, so that the voltage of a battery may be lower than that of operating the cameras. Accordingly, it is preferable to avoid increase in current supplied to a correction-lens-shifting means (for example, a voice coil motor) for the correction of hand movement.

The anti-vibration device by the lens-shifting system comprises a voice coil motor (VCM) as a correction-lens-shifting means, which comprises magnetic circuits comprising permanent magnets and yokes, and movable coils fixed to a frame holding a correction lens. To improve shifting efficiency without making the VCM larger, Japanese Patent 4,181,663 discloses an anti-vibration device comprising, as shown in FIG. 9($a$), permanent magnets 13$c$, 13$d$ polarized to have a pair of magnetic poles via unmagnetized neutral zones 13$f$1, 13$f$2, and a flat coreless coil 12 moving in a magnetic gap between the permanent magnets 13$c$ and 13$d$, the effective conductor width Wb of the coreless coil 12 and the magnetic pole width Wm of the permanent magnets 13$c$, 13$d$ meeting the relation of Wb<Wm≤Wb+Sc, wherein Sc represents the maximum movement distance in one direction of the coreless coil 12, which corresponds to ½ of St shown in FIG. 9($a$). In addition to this relation of size, this VCM has such a structure that the width of a coreless portion of the coreless coil 12, the width of the neutral zones 13$f$1, 13$f$2 of the permanent magnets 13$c$, 13$d$, and the maximum one-side movement distance Sc of the coreless coil 12 are the same, to obtain the maximum thrust when the correction lens moves by the maximum distance Sc. Because this VCM has the unmagnetized neutral zones 13$f$1, 13$f$2 between the opposing permanent magnets 13$c$, 13$d$, a volume percentage of the permanent magnet contributing to the generation of magnetic flux in the magnetic gap is smaller, resulting in a smaller amount of magnetic flux, meaning poorer magnetic efficiency. As a result, to obtain the predetermined thrust, large current should be supplied to the coil.

Further, although the VCM described in Japanese Patent 4,181,663 has slightly improved moving efficiency, a portion 51 of the coil 12 goes out of the magnetic gap (comes out of opposition to the permanent magnets 13$c$2, 13$d$2) when the coil moves from a center position (the original position) P0 by distance Sc to one direction as shown in FIG. 9($b$), resulting in drastic decrease in thrust in both end regions of the movement range of the coil. Accordingly, when the coil 12 moves, for example, in a direction F1 in FIG. 9($b$), large current should be supplied to the coil to compensate thrust drop in both end regions S1 of the movement range. Thus, in the anti-vibration device comprising the VCM described in Japanese Patent 4,181,663, electric power consumption increases at the time of correcting hand movement, because a portion 51 of the coil 12 goes out of the magnetic gap due to the neutral zones 13$f$1, 13$f$2 between the permanent magnets 13$c$, 13$d$.

An anti-vibration device described in Japanese Patent 2,641,172 comprises VCM, which comprises a magnetic circuit constituted by a pair of permanent magnets arranged with a predetermined gap and a yoke forming the magnetic gap, and a coil moving inside the magnetic gap. Like the unmagnetized neutral zones in Japanese Patent 4,181,663, the magnetic gap between a pair of permanent magnets is undesirable for magnetic efficiency, because it has a magnetic flux density reduced correspondingly to the volume decrease of the permanent magnets as compared with the gap-free structure. To compensate the decreased magnetic flux density, larger current should be supplied to the coil. In addition, Japanese Patent 2,641,172 does not describe the relations among the effective conductor width of the coil, the magnetic pole width of each permanent magnet and the longest one-direction movement distance of the coil, failing to take into consideration decrease in electric power consumption at the time of correcting hand movement.

An anti-vibration device described in JP 2008-209434 A comprises VCM, which comprises a pair of opposing yokes, a permanent magnet fixed to one yoke, and a coil moving inside a magnetic gap defined by the other yoke and the permanent magnet. The permanent magnet is magnetized to have two magnetic poles, N and S poles, in a plane. Such permanent magnet is substantially the same as those described in Japanese Patent 4,181,663 having the unmagnetized neutral zones between an N pole and an S pole. Likewise, JP 2008-209434 A does not describe the relations among the effective conductor width of the coil, the magnetic pole width of each permanent magnet, and the longest one-direction movement distance of the coil, failing to take into consideration decrease in electric power consumption at the time of correcting hand movement.

OBJECT OF THE INVENTION

Accordingly, an object of the present invention is to provide a correction-lens-moving voice coil motor with reduced electric power consumption for moving the correction lens and capable of generating stable thrust even at the longest movement distance of the coil, an anti-vibration device comprising this correction-lens-moving voice coil motor, and an interchangeable lens unit and an optical apparatus comprising this anti-vibration device.

DISCLOSURE OF THE INVENTION

The correction-lens-moving voice coil motor of the present invention comprises a magnet unit comprising a pair of yokes for defining a magnetic gap and a pair of permanent magnets fixed to a surface of each yoke opposing the magnetic gap, and a coil disposed in the magnetic gap, to cause the relative linear movement of the magnet unit and the coil by current supplied to the coil, thereby moving the correction lens;

each permanent magnet having different magnetic poles adjacent to each other along the movement direction on a surface opposing the magnetic gap;

both permanent magnets having different magnetic poles opposing via the magnetic gap;

when the width of the permanent magnets in the movement direction is two times the width Wm of the magnetic poles; the width Wa of the coil in the movement direction being smaller than the width 2Wm of the permanent magnet; and the effective conductor width Wb of the coil, the magnetic pole width Wm of the permanent magnet and the longest movement distance St of the correction lens meeting the conditions of Wm=(Wb+St)×K, wherein K is a constant meeting $1<K \le 1.5$; and a peak value of a magnetic flux density distribution in the magnetic gap being 0.5 T or more.

The permanent magnet is integral in the first embodiment of the present invention, and constituted by a pair of permanent magnet blocks magnetized in a thickness direction and adjacent to each other along the movement direction in the second embodiment of the present invention. In the case of the second embodiment, the permanent magnet blocks are disposed such that their different magnetic poles are arranged along the movement direction. When a permanent magnet block is fixed to each of a pair of yokes, the permanent magnet blocks are disposed such that their different magnetic poles are not only arranged along the movement direction but also opposing.

The permanent magnet is preferably a sintered rare earth magnet having a residual magnetic flux density of 1.3 T or more.

The constant K is preferably in a range of 1.1-1.5, more preferably in a range of 1.1-1.3.

It is preferable that the magnet unit is fixed, while the coil is movable.

The anti-vibration device of the present invention comprises a correction lens, a frame supporting the correction lens and arranged in a holding member such that it can move in two perpendicular to the optical axis, and a pair of voice coil motors arranged in the holding member such that the frame can linearly move in the two directions;

each voice coil motor comprising a magnet unit comprising a pair of yokes fixed to the holding member for providing a magnetic gap and a pair of permanent magnets fixed to a surface of each yoke opposing the magnetic gap, and a coreless coil disposed in the magnetic gap and fixed to the frame;

each permanent magnet having different magnetic poles adjacent to each other along the movement direction of the coil on a surface opposing the magnetic gap;

both permanent magnets having different magnetic poles opposing via the magnetic gap;

when the width of the permanent magnets in the movement direction is two times the width Wm of the magnetic poles, the width Wa of the coreless coil in the movement direction being smaller than the width 2Wm of the permanent magnets; and the effective conductor width Wb of the coreless coil, the magnetic pole width Wm of the permanent magnets and the longest movement distance St of the correction lens meeting the conditions of Wm=(Wb+St)×K, wherein K is a constant meeting $1<K \le 1.5$;

the longest movement distance St of the correction lens being in a range of 1-4 mm; and a peak value of a magnetic flux density distribution in the magnetic gap being 0.5 T or more;

whereby the correction lens is moved by the coreless coil to which current is supplied, to carry out the correction of hand vibration.

The interchangeable lens unit of the present invention comprises the above anti-vibration device in addition to an imaging lens and a focus lens in a barrel. The interchangeable lens unit of the present invention includes interchangeable, single-focus lens units and interchangeable zoom lens units.

The optical apparatus of the present invention comprises the above anti-vibration device, and forms an optical image on an image sensor through an optical system comprising an imaging lens, a focus lens and the correction lens. The optical apparatus of the present invention includes digital cameras (for example, interchangeable-lens, digital, single-lens reflex cameras), video cameras, binoculars, monitoring cameras, astronomical telescopes, etc.

DESCRIPTION OF THE BEST MODE OF THE INVENTION

Figure 1:
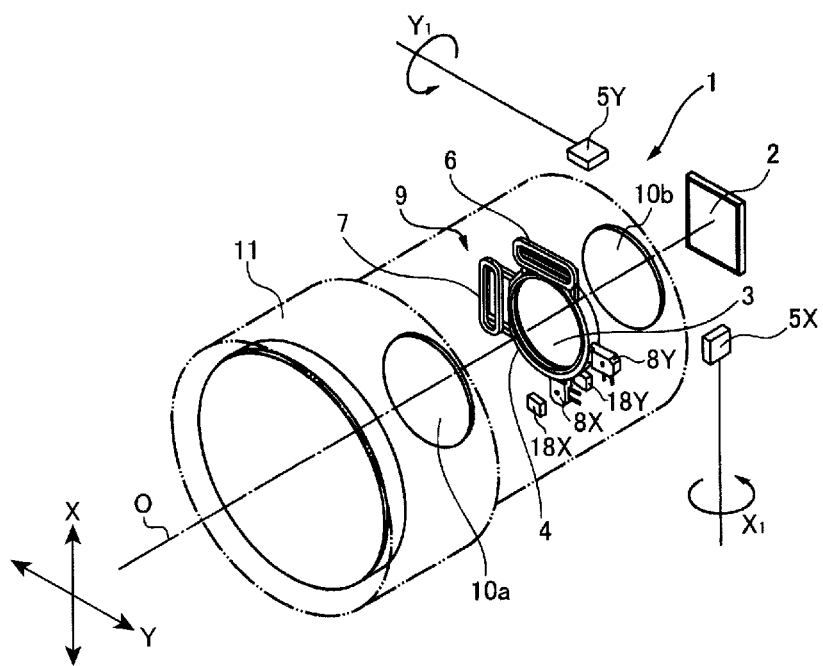
FIG. 1 is a perspective view showing the structure of an anti-vibration device comprising the correction-lens-moving voice coil motor of the present invention in a camera.

Taking a case where the anti-vibration device is used in an interchangeable lens unit mounted to a digital, single-lens reflex camera for example, the embodiments of the present invention will be explained below in detail referring to the attached drawings, without intention of restricting the present invention thereto. FIG. 1 shows the structure of an anti-vibration device comprising the correction-lens-moving voice coil motor according to an embodiment of the present invention, FIG. 2 shows the structure of a correction-lens-supporting frame used in this anti-vibration device, FIG. 3 shows the front shape of the correction-lens-supporting frame, and FIGS. 4 and 5 schematically show the structure of this correction-lens-moving voice coil motor.

[1] Anti-Vibration Device (A) Entire Structure

As shown in FIG. 1, the interchangeable lens unit comprising an anti-vibration device 1 for preventing the blurring of image due to hand vibration (for example, vibration having a frequency of several Hz to several tens of Hz) while photographing has an optical system constituted by pluralities of lenses including imaging lenses 10a, 10b, a focus lens (not shown), and a correction lens 3 in a barrel 11. To correct hand vibration comprising the vertical vibration in the X direction (pitch direction) and horizontal vibration in the Y direction (yaw direction) of a camera, the anti-vibration device 1 has a function of moving a correction lens 3 in the X and Y directions in response to vibration detected by a vibration detector (vibration-detecting sensor), to correct an image-forming position on an image sensor (CMOS or CCD) 2 when a release button is turned on.

The anti-vibration device 1 comprises a frame 4 for supporting a peripheral portion of the correction lens 3, a vibration detector 5X for detecting the vibration of a camera in the X direction, a vibration detector 5Y for detecting the vibration of a camera in the Y direction, a first correction-lens-moving voice coil motor 6 for moving the correction-lens-supporting frame 4 in the X direction, and a second-correction-lens-moving voice coil motor 7 for moving the correction-lens-supporting frame 4 in the Y direction. For the purpose of simplicity, only coils in the voice coil motors 6, 7 are shown in FIG. 1. While not photographing, the correction lens 3 is held at a center position of the barrel 11 by a lock member (not shown).

The vibration detectors 5X, 5Y may be vibration sensors such as angular velocity sensors (gyro sensors), acceleration sensors, angle sensors, etc., and preferably gyro sensors from the aspect of response and sensitivity. Vibration-detecting directions detected by the vibration detectors 5X and 5Y are indicated by $X_1$ and $Y_1$ in FIG. 1.

The correction-lens-supporting frame 4 is integrally connected to first and second coreless coils 12, 15 constituting the first and second correction-lens-moving voice coil motors (simply called "voice coil motors") 6, 7. The anti-vibration device 1 further comprises position detectors 8X and 8Y for detecting the position of the correction-lens-supporting frame 4. Each position detector 8X, 8Y comprises, for example, a position-sensitive detector (PSD) inputting infrared rays emitted from an infrared LED 18X, 18Y through a slit (not shown) fixed to the correction-lens-supporting frame 4, utilizing the change of the output current of PSD depending on the movement of the slit to detect the position of the correction-lens-supporting frame 4.

The anti-vibration device 1 further comprises a correction-lens-holding member 9 integrally having a ring-shaped circuit board (not shown). The correction-lens-holding member 9 is fixed to the barrel 11 of the lens unit. Though not shown, the correction-lens-supporting frame 4 is resiliently supported by the correction-lens-holding member 9 via coil springs on its peripheral surface with an equal interval at plural positions (for example, 3 or 4). The correction-lens-supporting frame 4 is movable in the X and Y directions by pluralities of small ball members disposed along a circumferential direction between one end surface of the correction-lens-supporting frame 4 and a flat surface portion fixed to the barrel 11 with an equal interval.

When direct current is supplied to the first and second voice coil motors 6, 7, the first and second coils 12 and 15 move linearly in perpendicular directions (X direction for the first coil 12, and Y direction for the second coil 15 in FIG. 1), so that the correction-lens-supporting frame 4 (correction lens 3) fixed to the first and second coils 12, 15 move by a very small distance in the X and Y directions against the resilience of coil springs mounted between the frame 4 and the correction-lens-holding member 9. By adjusting the direction and level of direct current supplied to the first and second voice coil motors 6, 7, the movement distance of the correction-lens-supporting frame 4 in the X and Y directions can be controlled.

(B) Correction-Lens-Moving Voice Coil Motor

FIGS. 2-4 show the structures of the first and second correction-lens-moving voice coil motors 6 and 7 assembled in the anti-vibration device 1.

Figure 2A:
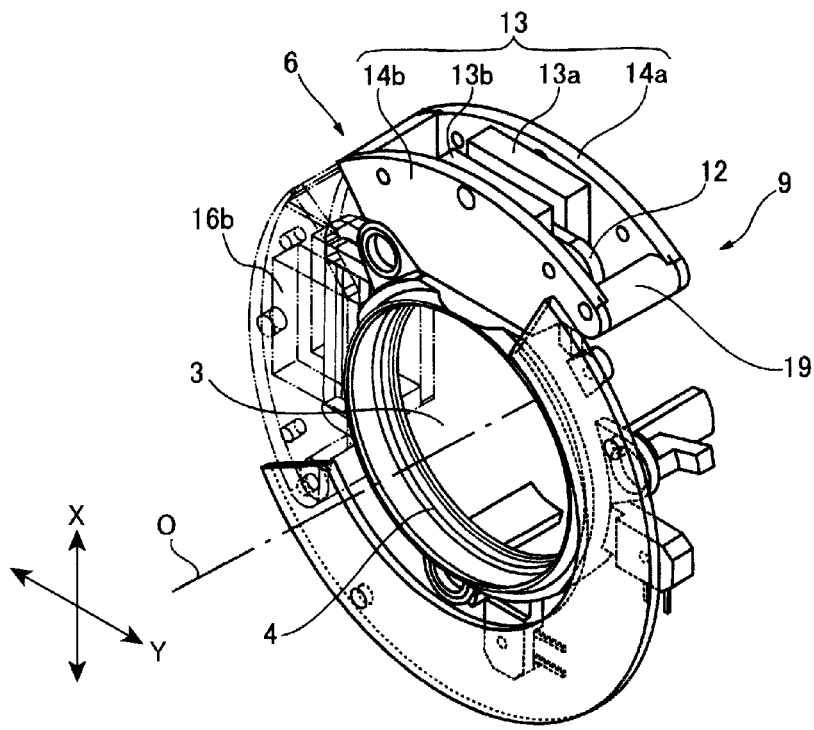
FIG. 2(a) is a perspective view showing the structure of a correction-lens-holding member constituting the anti-vibration device shown in FIG. 1, near a first correction-lens-moving voice coil motor.
Figure 2B:
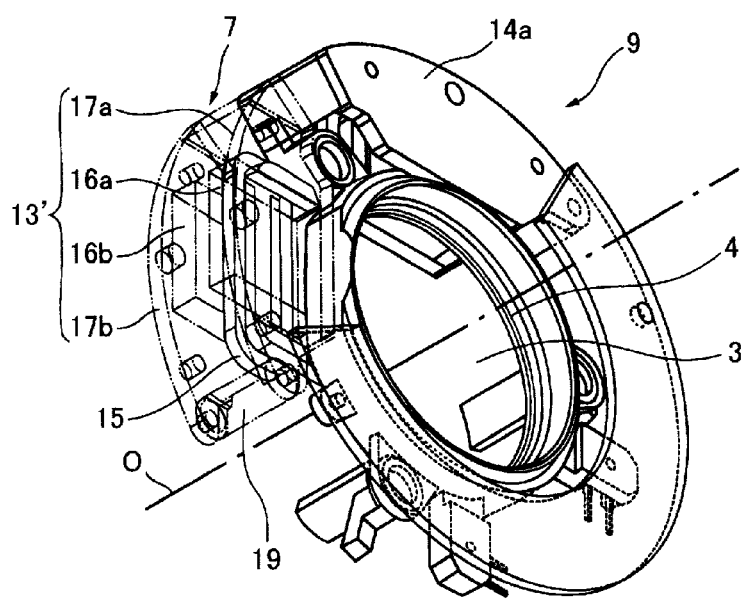
FIG. 2(b) is a perspective view showing the structure of a correction-lens-holding member constituting the anti-vibration device shown in FIG. 1, near a second correction-lens-moving voice coil motor.
Figure 3:
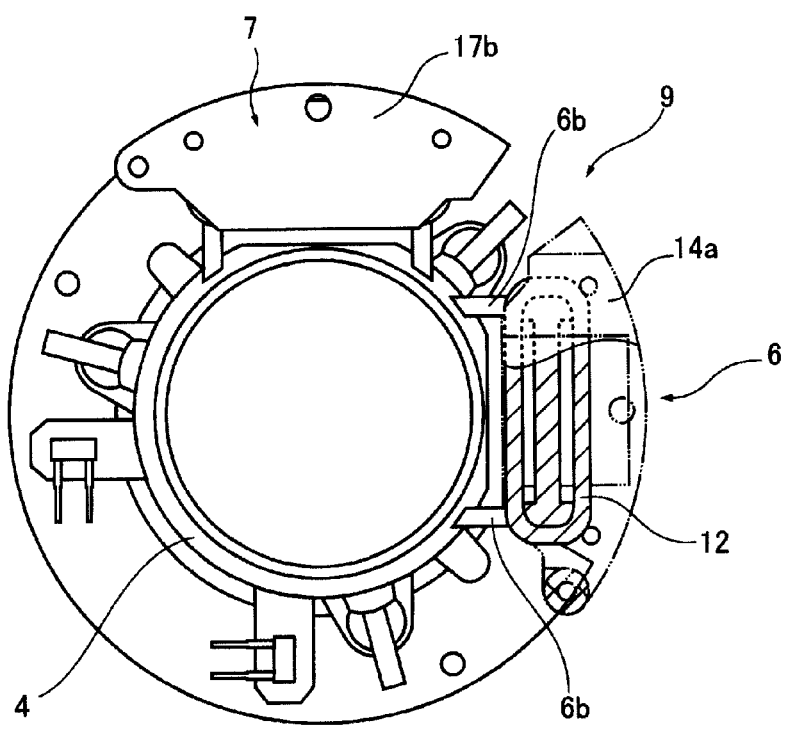
FIG. 3 is a partially cross-sectional front view showing the correction-lens-holding member of FIG. 2.
Figure 4A:
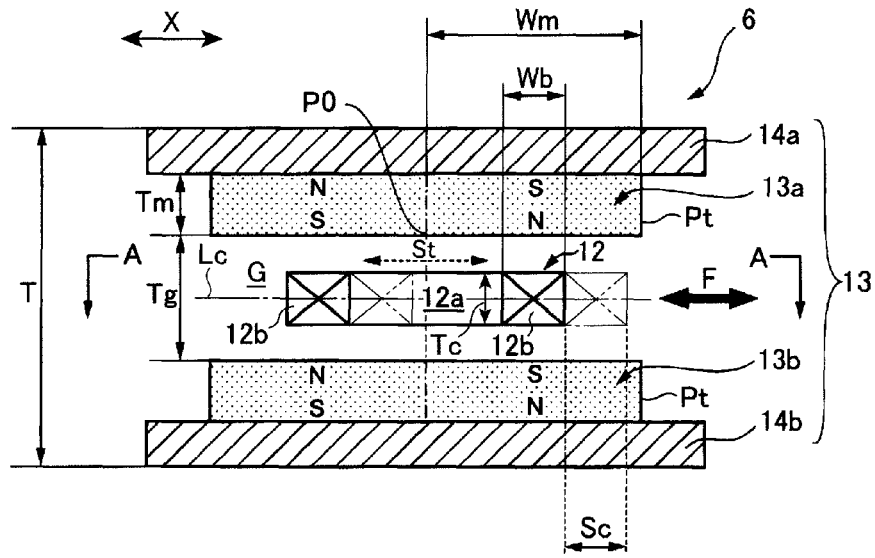
FIG. 4(a) is a cross-sectional view showing a correction-lens-moving voice coil motor according to an embodiment of the present invention, in which a coreless coil is located at a center position.
Figure 5:
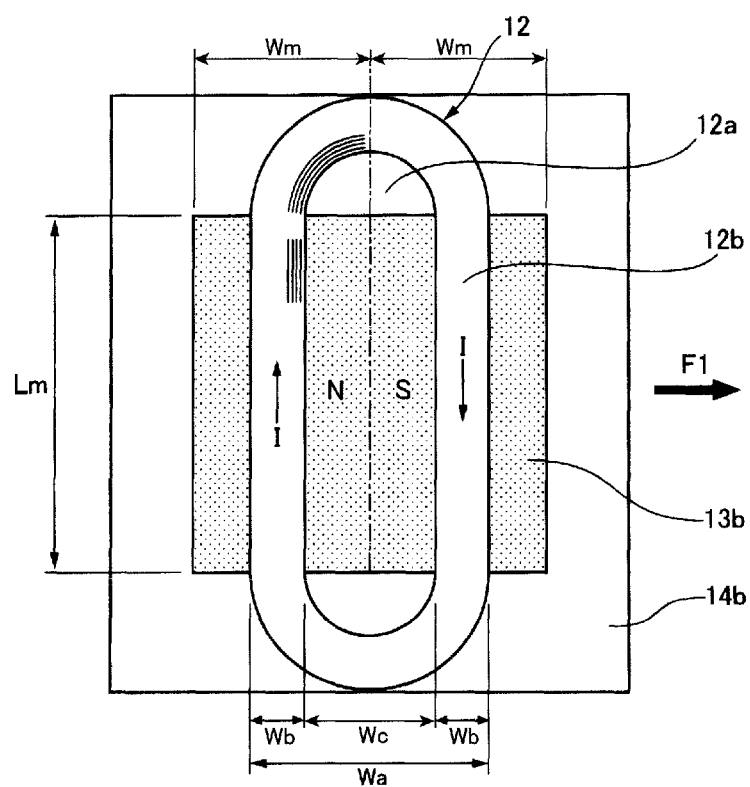
FIG. 5 is a cross-sectional view taken along the line A-A in FIG. 4(a).

As shown in FIGS. 2(a) and 4(a), the first correction-lens-moving voice coil motor 6 is a moving-coil-type voice coil motor (linear actuator) comprising a first flat coreless coil (hereinafter referred to as "first coil") 12 moving back and forth as a mover in the X direction, and a magnet unit (magnetic circuit) 13 serving as a stator, the magnet unit 13 comprising a pair of permanent magnets 13a and 13b arranged in parallel to the optical axis O of the interchangeable lens unit, a yoke 14a fixed to the permanent magnet 13a, and a yoke 14b fixed to the permanent magnet 13b. A pair of permanent magnets 13a and 13b define a magnetic gap, in which the first coil 12 is disposed. A pair of yokes 14a, 14b are made of a ferromagnetic material (for example, steel), and fixed to the correction-lens-holding member 9 at predetermined positions in the barrel 11. Thus, the first voice coil motor 6 has such a structure that the first coil 12 is disposed along a centerline Lc in a magnetic gap G between a pair of opposing permanent magnets 13a, 13b. As shown in FIG. 3, the first coil 12 is fixed to the correction-lens-supporting frame 4 via a connecting member 6b. As shown in FIG. 2(*a*), a pair of yokes 14a, 14b are connected, for example, via a spacer 19 made of a non-magnetic material to have a predetermined gap.

The permanent magnets 13a, 13b are rectangular, and the magnetic-path-forming yokes 14a, 14b are planar. As shown in FIG. 4(*a*), the permanent magnets 13a and 13b are magnetized in a thickness direction to have a pair of magnetic poles N, S adjacent to each other in the movement direction of the coil on surfaces opposing the magnetic gap G, and fixed to the yokes 14a, 14b such that their different magnetic poles are opposing the magnetic gap G.

The magnet unit 13 is not restricted to the depicted structure, but may have, for example, a structure that only one permanent magnet is fixed to a yoke. This structure of the magnet unit is simple and free from magnetic interference because a permanent magnet is fixed to only one yoke, making its assembly easy. In this case, however, a small amount of magnetic flux is naturally generated in the magnetic gap, making it necessary to use a permanent magnet having higher magnetic properties or a thicker permanent magnet to obtain the same amount of magnetic flux as that of the structure having a pair of permanent magnets.

The permanent magnet need only have different magnetic poles adjacently in the movement direction of the coil on surfaces opposing the magnetic gap. To meet this condition, (a) an integral magnet may have planar magnetization (so-called, multi-pole, planar magnetization) in a predetermined magnetic pole width, or (b) a pair of permanent magnet blocks magnetized in a thickness direction (so-called single-pole magnetization) may be arranged such that their different magnetic poles are adjacent to each other in the movement direction of the coil. In the case of (a), a magnetization operation and the handling of a magnetized permanent magnet are easy, suitable for industrial mass production. In this case, there is slight magnetic flux distribution disturbance in a region in which magnetic poles are reversed, or there is a region in which the magnetic flux is substantially zero, but the width of such region is so small that it is substantially negligible. In the case of (b), the operation of fixing a pair of permanent magnet blocks magnetized in a thickness direction adjacently to a yoke is slightly complicated, but substantially uniform magnetic flux is generated from the entire magnetic-pole surfaces of the permanent magnet blocks, resulting in a uniform magnetic flux distribution in the magnetic gap with reduced magnetic flux density decrease at both ends of the permanent magnet (for example, 50% or more of the peak of a magnetic flux density in the magnetic gap).

In the voice coil motor shown in FIG. 4(*a*), when the integral permanent magnet in the above (a) is used as each permanent magnet 13a, 13b, a main surface of each permanent magnet 13a, 13b having width 2Wm is magnetized to have N and S poles with magnetic pole width Wm adjacently, and each permanent magnet 13a, 13b is fixed to each yoke 14a, 14b such that their different magnetic poles are opposing via the magnetic gap G.

When each permanent magnet 13a, 13b is constituted by the permanent magnet blocks in the above (b), four permanent magnet blocks with the desired width Wm are magnetized in a thickness direction, a first pair of permanent magnet blocks arranged with different magnetic poles adjacent to each other are fixed to one yoke, and a second pair of permanent magnet blocks are then fixed to the other yoke with different magnetic poles adjacent to each other, and with different magnetic poles opposing between the first and second pairs of permanent magnet blocks.

Materials for the permanent magnets 13a and 13b are not restrictive, but rare earth magnets having high gap magnetic flux densities and capable of being placed in a narrow space are preferable. Particularly preferable are anisotropic, sintered R-T-B magnets, wherein R is one or more rare earth elements (Nd is indispensable) including Y, and T is Fe or Fe and Co, which have corrosion-resistant surface treatment layers (for example, plating or resin layers). To generate stable thrust with small current, for example, in a magnet unit structure in which permanent magnets are disposed on the opposing surfaces of the yokes, it is preferable to use permanent magnets having such magnetic properties (residual magnetic flux density) as providing a magnetic flux density of 0.5 T or more, preferably 0.9 T or more in the magnetic gap G. The residual magnetic flux density of the permanent magnet per se is preferably 1.3 T or more.

As described above, the magnet unit constituting the correction-lens-moving voice coil motor of the present invention may have various structures depending on the yokes and the permanent magnets. In addition to the above structural feature, the optimum structure should be selected, taking into consideration the required moving force (thrust), the shape and size of the magnet unit, etc.

The above explanation of the structure of the moving-coil-type voice coil motor shown in FIG. 4(*a*) is applicable to the moving-magnet-type voice coil motor. To reduce electric power consumption, the moving-coil-type voice coil motor is more preferable.

The first flat coil 12 has an elongated circular shape, and its multi-layer winding 12b is obtained by winding a conductor wire (for example, resin-coated wire) to have a coreless portion 12a. As shown in FIG. 5, the width Wa of the first coil 12 in the movement direction [=Wb×2+Wc, wherein Wb is the width (effective conductor width) of the winding 12b, and Wc is the width of coreless portion 12a] is smaller than the width 2Wm of the permanent magnet 13b (13a). Namely, Wa=2Wb+Wc<2Wm. Further, the condition that the first coil 12, whose center substantially in agreement with a center of the permanent magnet is the original position, does not go out of the permanent magnet, even when it moves by St (Sc×2) at maximum, is 2Wb+Wc+St<2Wm.

The thickness Tc of the winding 12b is preferably about 1.2-2.0 mm. Although a thicker winding 12b generates larger thrust because of the increased number of turns, it makes the magnet unit larger because of the expansion of the magnetic gap G. With the same conductor wire diameter, the number of turns of the winding 12b is proportional to the space factor and the cross section area of the coil, but the cross section area of the coil is restricted by the magnetic gap G. Accordingly, a winding method providing a large space factor is preferable. The space factor of the first flat coil 12 is preferably 50% or more, more preferably 70% or more. In order that the first flat coil 12 can move stably, at least part of the coreless portion 12a may be filled with such materials as non-magnetic materials such as plastics, aluminum alloys, etc., or ferromagnetic materials such as steel, etc., for mass balance adjustment.

As shown in FIG. 2(*b*), the second correction-lens-moving voice coil motor 7 is also a moving-coil-type voice coil motor (linear actuator), which comprises a second flat coreless coil (hereinafter referred to as "second coil") 15 as a movable member, and a magnet unit (magnetic circuit) 13' as a stator. The magnet unit 13' comprises a pair of permanent magnets 16a, 16b disposed in parallel with the optical axis O of the interchangeable lens unit, a yoke 17a fixed to the permanent magnet 16a, a yoke 17b fixed to the permanent magnet 16b, and a second coil 15 disposed in the magnetic gap defined by a pair of the permanent magnets 16a, 16b. Each yoke 17a, 17b is made of a ferromagnetic material (for example, steel). Thus, the second voice coil motor 7 has a structure in which the second coil 15 is disposed in the magnetic gap between the opposing permanent magnets 16a, 16b. The yokes 17a, 17b are integrally attached to the correction-lens-holding member 9 at a predetermined position in the barrel 11. Like the first coil 12, the second coil 15 is fixed to the correction-lens-supporting frame 4 via a connecting member (not shown), and a pair of yokes 17a, 17b are connected via a spacer 19 made of, for example, a non-magnetic material to have a predetermined gap.

(C) Correction System of Hand Vibration

Figure 6:
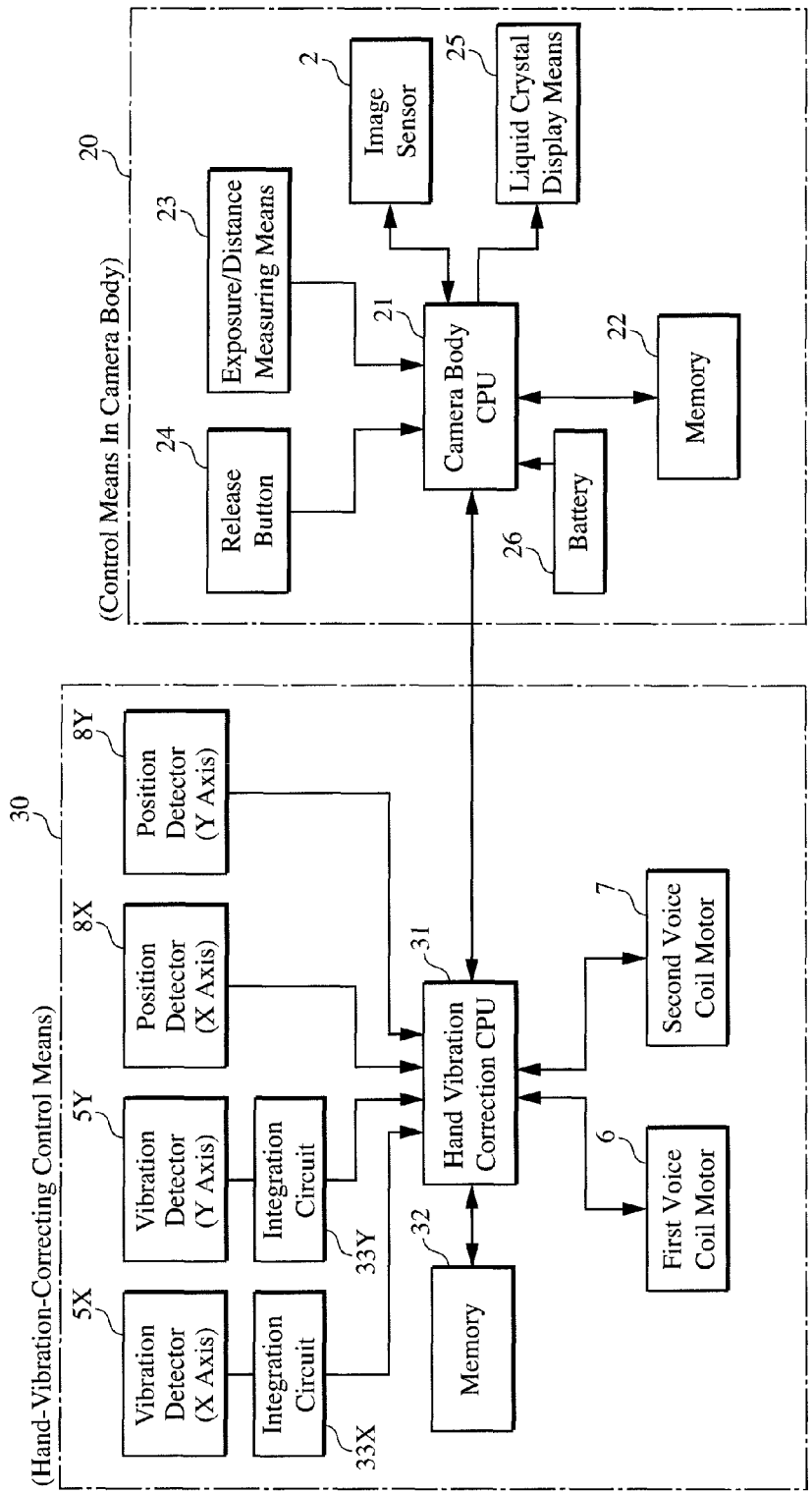
FIG. 6 is a block diagram showing one example of control systems for the anti-vibration device of the present invention.

The method of correcting hand movement by the anti-vibration device 1 with the voice coil motors 6, 7 while photographing will be explained. FIG. 6 shows one example of hand movement correction control systems for the interchangeable lens unit (for example, for digital, single-lens reflex cameras) comprising the anti-vibration device 1.

The interchangeable lens unit comprising the anti-vibration device of the present invention 1 comprising a hand-vibration-correcting control means 30, and is detachably mounted to a camera body comprising a body control means 20. The body control means 20 has communications with the hand-vibration-correcting control means 30 to control the movement of the correction lens 3. The hand-vibration-correcting control means 30 comprises a hand movement correction CPU 31, and a control circuit including CPU 31 is mounted onto pluralities of circular or semicircular circuit boards, and received in the correction-lens-holding member 9. The body control means 20 comprises a camera body CPU 21. The camera body CPU 21 and the hand vibration correction CPU 31 are, for example, microchips connected via a communications interface circuit (not shown).

The camera body CPU 21 is connected via bass signal lines and interface circuits (not shown) to a memory 22, a focus-lens-moving means for adjusting the focal distance, a moving means 23 including a diaphragm-adjusting means, an image sensor (CCD) 2, a release button 24, a liquid crystal display means 25 for displaying the picture image being taken, etc. The camera body is provided with a battery 26 for supplying electric power to electronic circuits, etc. The memory 22 comprises ROM for storing a signal-treating program, and RAM for temporarily storing digital image data.

The hand movement correction CPU 31 is connected via bass signal lines and interface circuits (not shown) to a memory 32, an integration circuit 33X, 33Y, vibration detectors 5X, 5Y, position detectors 8X, 8Y, a circuit (not shown) for driving the first voice coil motor 6, a circuit (not shown) for driving the second voice coil motor 7, infrared LEDs 18X, 18Y, etc. The vibration detector 5X is connected to the integration circuit 33X, and the vibration detector 5Y is connected to the integration circuit 33Y. To conduct the correction of hand movement based on vibration detected by the vibration detectors 5X, 5Y, the memory 32 comprises ROM for storing a program for controlling a circuit for driving the first and second correction-lens-moving voice coil motors 6, 7, and RAM used as a region for conducting calculation for this control. Though not shown, the output signals of the position detectors 8X, 8Y are input to the memory 32 via an amplification circuit and an A/D converter.

[2] Correction Operation of Hand Vibration

When the release button 24 of a digital camera having the interchangeable lens unit comprising the anti-vibration device 1 is pushed, shutter-opening signals are input to the camera body CPU 21, from which a shutter-opening control command is output to the anti-vibration device 1 in the interchangeable lens unit. The hand vibration correction CPU 31 reads a hand-vibration-correcting control program in the memory 32.

When the vibration detectors 5X, 5Y detect the hand movement (low-frequency vibration) of the interchangeable lens unit, their output signals (for example, angular velocity signals) are input to the hand vibration correction CPU 31 via an A/D converter (not shown). After removing noise (low-frequency noise when there is no hand movement) from the input signals by a filter (not shown), the signals are integrated by the integration circuits 33X, 33Y to obtain data (target position data) representing the movement distances of the first and second coils 12, 15 from the center position (original position) to the target position in the X and Y directions. Simultaneously, the present position of the correction-lens-supporting frame 4 (correction lens 3) is detected by the position detectors 8X, 8Y with a predetermined time interval (for example, 10 ms), and the output signals of the position detectors 8X, 8Y are input to CPU 31 via the amplifier and the A/D converter. When the output signals of the vibration detectors 5X, 5Y are less than a threshold, it is determined that there is no hand movement, making the movement of the first coil 12 or the second coil 15 needless.

The CPU 31 generates a feedback control signal for reducing the difference between a present position and a target position to zero. When control current obtained based on this control signal is supplied to the first and second coils 12, 15, according to the Fleming's left hand rule, an X-direction thrust F1 crossing magnetic flux in the magnetic gap G is generated in an effective conductor portion (width Wb, length Lm) of the first voice coil motor 6, and a Y-direction thrust crossing magnetic flux in the magnetic gap is generated in an effective conductor portion of the second voice coil motor 7. As a result, the first and second coils 12, 15 move in the X and Y directions, so that the correction-lens-supporting frame 4 fixed to the first and second coils 12, 15 moves in the X and Y directions. Feedback control is conducted until the difference between the present position and the target position becomes zero. When the present position of the correction lens 3 becomes equal to the target position, the hand vibration correction operation is completed, so that image data free from influence of the hand movement is input to the image sensor 2, and stored in the memory 22.

After the completion of photographing, the camera body CPU 21 sends control command indicating the completion of photographing to the hand-movement-correcting control means 30, and the hand vibration correction CPU 31 receiving this control command supplies direct current in an opposite direction to the hand-vibration-correcting operation to the first and second coils 12 and 15, thereby returning the first and second coils 12, 15 to the center position (the original position).

[3] Thrust Characteristics of Correction-Lens-Moving Voice Coil Motor

Because the first and second voice coil motors have essentially the same thrust characteristics, and because the first and second coils in each voice coil motor also have essentially the same thrust characteristics, the thrust characteristics will be explained, taking the first coil 12 in the first voice coil motor 6 for example.

As shown in FIG. 4(a), the effective conductor width Wb of the first coil 12 is the width of a portion of the first coil 12 which crosses magnetic flux generated from the permanent magnets 13a, 13b to contribute to the generation of thrust. The width (half of the magnet width in the depicted example)

Wm of one magnetic pole of the permanent magnet 13a is the width of a magnetic pole N or S on the permanent magnet 13a. The longest movement distance St of the first coil 12 (or correction-lens-supporting frame 4) is the maximum distance that the first coil 12 moves in both directions F (equal to the X direction), two times the longest one-direction (F1-direction) movement distance Sc shown in FIGS. 4(a) and 4(b). The longest movement distance St of the first coil 12 corresponds to the longest movement distance of the correction lens.

Figure 7:
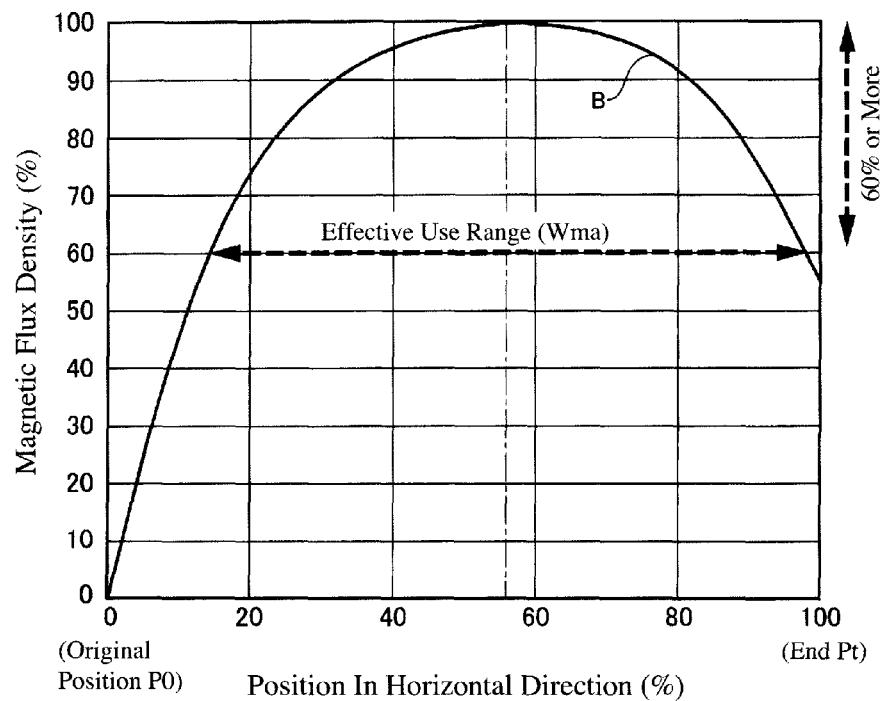
FIG. 7 is a graph showing a magnetic flux density distribution in a magnetic gap in the magnet unit shown in FIG. 4.

The magnetic gap G between the opposing permanent magnets 13a, 13b has a magnetic flux density distribution in the movement direction of the coil, for example, as shown in FIG. 7, which is a magnetic flux density distribution along the centerline Lc extending in the magnetic gap G in the movement direction of the coil as shown in FIG. 4(a). In FIG. 7, the X axis indicates the distance by a relative value (%) from the center position (original position) P0 to the end Pt of the permanent magnet 13, and the Y axis indicates a magnetic flux density by a relative value (%). As shown in FIG. 7, in a region from the original position P0 to the magnet end Pt (position of 100% from the original position P0) in the magnetic gap G, a magnetic flux density distribution in the movement direction of the coil is a circular distribution having a peak at an intermediate position (about 55% from the original position P0) of the permanent magnet 13a, and as large a magnetic flux density as about half (about 55%) of the peak at the end Pt of the permanent magnet 13a. Incidentally, in a region from the original position P0 to the end Pt of the permanent magnet 13a on the opposite side from above (on the S pole side of the permanent magnet 13a), there is a magnetic flux density distribution in an inverted shape to the curve B shown in FIG. 7.

In a region ("effective use range Wma" shown in FIG. 7), in which the magnetic flux density is, for example, 60% or more of the peak value, it is considered that stable thrust is obtained in the total movement range of the first coil 12 without increasing current. Accordingly, the magnetic pole width Wm should be determined, lest that the movement range of the first coil 12 deviates from the effective use range Wma. In the case shown in FIG. 7, the percentage of the effective use range Wma to the magnetic pole width Wm is about 84%. If a sum of the effective conductor width Wb and the longest movement distance St is within the effective use range Wma, large, stable thrust is obtained in the total movement range of the coil 12.

(A) Basic Condition

Figure 4B:
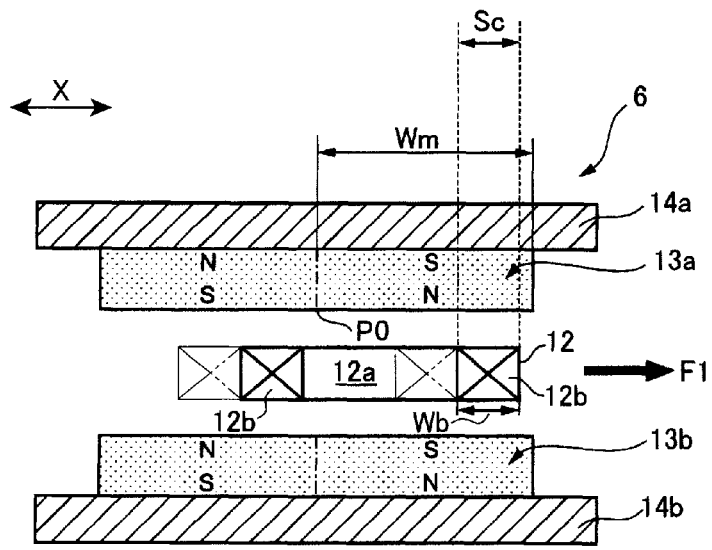
FIG. 4(b) is a cross-sectional view showing a correction-lens-moving voice coil motor according to an embodiment of the present invention, in which the coreless coil has moved maximally.

The evaluation of the correction-lens-moving voice coil motor of the present invention by magnetic field analysis simulation reveals that the basic condition for both miniaturization and power consumption reduction is that the magnetic pole width Wm meets the relation of Wm=(Wb+St)×K, wherein K is a constant meeting 1<K≤1.5. The constant K may change depending on the magnetic properties of the permanent magnet, the size of each member in the anti-vibration device and the interchangeable lens unit, for instance, the size of the barrel, etc., but to obtain a thrust distribution with good linearity in the total movement range of the first coil 12, namely to suppress thrust drop near the ends Pt of the opposing permanent magnets 13a, 13b, the constant K should meet K>1, namely Wm>Wb+St. This ensures that even when the first coil 12 moves from the center position P0 where it stops as shown in FIG. 4(a) in the F1 direction (X direction) as shown in FIG. 4(b) by the maximum one-side distance Sc, the winding 12b of the first coil 12 does not go beyond the ends Pt of the permanent magnets 13a, 13b, but surely crosses magnetic flux flowing from the N pole of the permanent magnet 13a to the S pole of the permanent magnet 13b. As a result, even when the first coil 12 moves in the F1 direction by the maximum one-side distance Sc, thrust for moving the first coil 12 and thus the correction-lens-supporting frame 4 is suppressed from decreasing.

The value of K is determined by three parameters, the longest movement distance St of the coil, the effective conductor width Wb of the coil, and the magnetic pole width Wm. The longest movement distance St is determined such that a movable member of the anti-vibration device does not interfere with surrounding members such as the barrel of the interchangeable lens unit, preferably in a range of 1-4 mm. The effective conductor width Wb of the coil is preferably in a range of 1-2 mm, to have the number of turns necessary for sufficient thrust for moving the correction lens 3. The magnetic pole width Wm is preferably in a range of 3-9 mm, because too narrow Wm provides a low magnetic flux density in the magnetic gap, and because too wide Wm prevents the miniaturization of the anti-vibration device and the interchangeable lens unit. When the effective conductor width Wb of the coil and the longest movement distance St are constant, large K provides too large magnetic pole width Wm, preventing the miniaturization of the anti-vibration device and the interchangeable lens unit. Accordingly, K is preferably more than 1 and 1.5 or less, more preferably 1.05-1.5, further preferably 1.08-1.5, most preferably 1.1-1.5, particularly 1.1-1.3.

(B) Additional Conditions

To increase thrust with higher linearity, the correction-lens-moving voice coil motor of the present invention preferably meets, in addition to the basic condition, the following additional conditions:

(1) Additional Condition 1

When a peak value of a magnetic flux density distribution in the magnetic gap G is 0.5 T or more, the coil can generate large thrust.

(2) Additional Condition 2

When the magnetic pole width Wm is constant, increase in the longest one-side movement distance Sc provides decreased thrust as the coil nears an end of the movement range. Thus, with the magnetic flux density peak of 0.9 T or more in the magnetic gap G, a thrust constant of 2-4 N/A can be obtained at the longest one-side movement distance Sc of 1-2 mm, thereby providing sufficiently large thrust even at an end of the maximum movement range.

(3) Additional Condition 3

The first and second coils 12, 15 preferably have a space factor of 50% or more. When the space factor is 50% or more, the desired thrust can be obtained by using, for example, a sintered rare earth magnet having as high a residual magnetic flux density Br as 1.3 T or more for the correction-lens-moving voice coil motor of the present invention. To obtain stable thrust in the longest movement distance St of the coils 12, 15, the first and second coils 12, 15 preferably have a space factor of 70% or more.

Example 1

Figure 8:
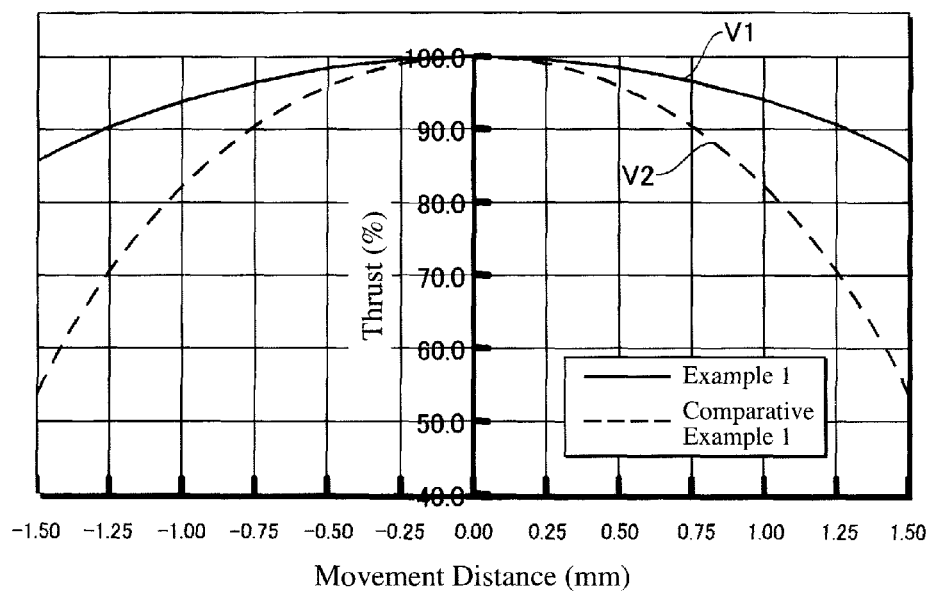
FIG. 8 is a graph showing the change of thrust (relative value) in the correction-lens-moving voice coil motors of Example 1 and Comparative Example 1.

In the correction-lens-moving voice coil motor of the present invention 6 having the structure shown in FIG. 4(a), the thrust of the first coil 12, when the first coil 12 moved from the center position P0 in the F1 direction (X direction) by the longest one-side movement distance Sc (1.5 mm), was determined under the conditions shown in Table 1, using a commercially available, three-dimensional magnetic field analysis simulation software. Direct current supplied to the first coil 12 was 0.1 A, with voltage of 2.0 V. The magnetic flux density in the magnetic gap G was 0.94 T, and the thrust constant was 2.4-2.7 N/A. The results are shown in FIG. 8. The thrust is expressed by a relative value when the thrust at the original position was 100%. Because the conditions of Example 1 were Wm=5.0 mm, and (Wb+St)=4.5 mm, K was 1.1, meeting the basic condition of the present invention.

Comparative Example 1

Figure 9A:
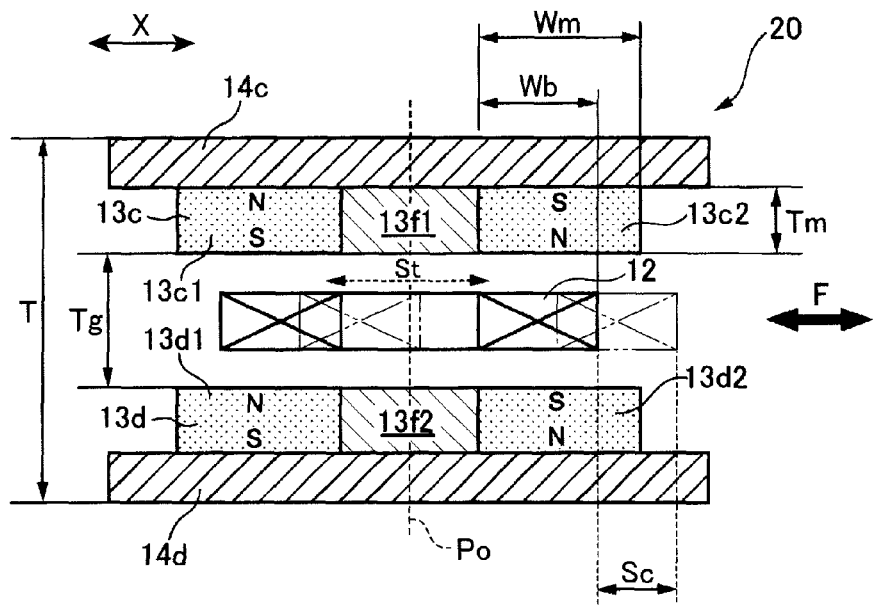
FIG. 9(a) is a schematic cross-sectional view showing a voice coil motor used in the conventional anti-vibration device, in which a coreless coil is located at a center position.
Figure 9B:
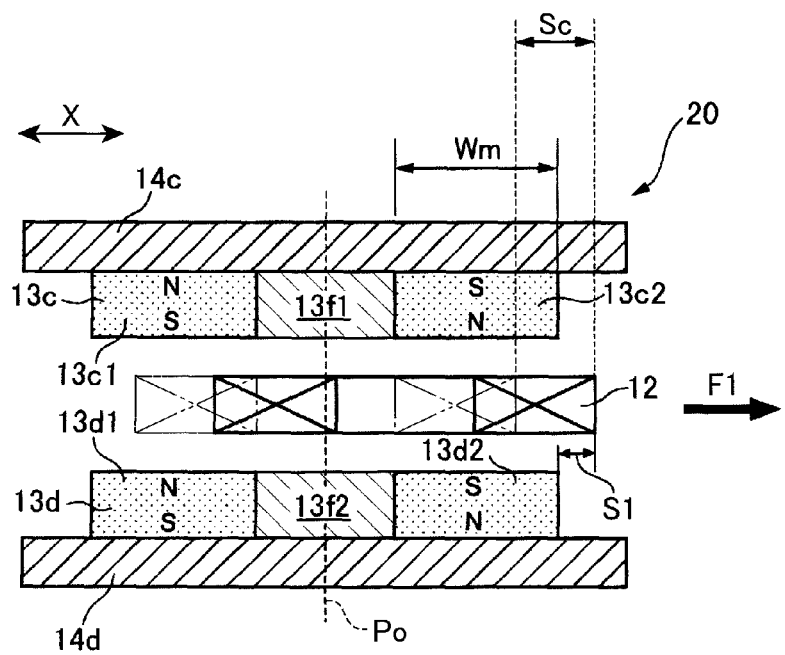
FIG. 9(b) is a schematic cross-sectional view showing the voice coil motor of FIG. 9(a), in which the coreless coil has moved maximally.

The thrust of the first coil 12 in a voice coil motor 20 having the structure shown in FIG. 9(a), which had unmagnetized neutral zone 13/1, 13/2 as described in Japanese Patent 4,181,663, was determined by the same magnetic field analysis simulation as in Example 1, under the conditions shown in Table 1. The results are shown in FIG. 8 like Example 1. Because the conditions of Comparative Example 1 were Wm=3.0 mm, and (Wb+St)=4.85 mm, K was 0.62, not meeting the basic condition of the present invention.

TABLE 1

| Simulation Analysis Conditions | | Example 1 | Comparative Example 1 |
|---|---|---|---|
| Width Tg of Magnetic Gap G | | 1.5 mm | 1.5 mm |
| Permanent Magnet | Material | NMX-S54[1] | NMX-S54 |
| | Thickness Tm | 3.0 mm | 3.0 mm |
| | Width Wm of Magnetic Poles | 5.0 mm | 3.0 mm |
| | Width of Neutral Zone | 0 | 1.5 mm |
| Yoke Material | | SPCC[2] | SPCC |
| First Coil | Width Wa in Movement Direction | 6.5 mm | 5.2 mm |
| | Effective Conductor Width Wb | 1.5 mm | 1.85 mm |
| | Longest One-Side Movement Distance Sc | 1.5 mm | 1.5 mm |
| | Longest Movement Distance St | 3.0 mm | 3.0 mm |
| Wb + St | | 4.5 mm | 4.85 mm |
| Value of K | | 1.1 | 0.62 |

Note
[1]An integral, sintered rare earth magnet (available from Hitachi Metals, Ltd., residual magnetic flux density Br = 1.45 T) magnetized to have N and S poles each having a width Wm on opposing surfaces.
[2]Cold-rolled steel plate.

In FIG. 8, a curve V1 shows the thrust change of the first coil 12 in the voice coil motor of Example 1, and a curve V2 shows the thrust change of the first coil 12 in the voice coil motor 6 of Comparative Example 1. When the correction lens 3 moved by 1.5 mm in the X direction, thrust decrease was as small as about 13% in the voice coil motor 6 of Example 1, but as large as about 45% in the voice coil motor 20 of Comparative Example 1. Even when the first coil 12 moved by the longest one-side movement distance Sc, thrust decrease in Example 1 was ⅓ or less of that in Comparative Example 1. It is thus clear that the voice coil motor 6 of the present invention can maintain larger thrust (better thrust linearity) than that of the voice coil motor 20 of Comparative Example 1 in the total movement range of the coil. The voice coil motor 6 of the present invention with smaller thrust decrease suffers less electric power consumption for hand movement correction. Of course, the voice coil motor 7 also has excellent thrust linearity in the total movement range of the coil.

Meeting the condition of 1<Wm/(Wb+St), the voice coil motor 6 of the present invention has better thrust linearity than that of the voice coil motor 20 of Comparative Example 1 in the total movement range of the coil. Accordingly, the first coil 12 moves in a region having a high magnetic flux density (Wma shown in FIG. 7), resulting in small thrust decrease even when the first coil 12 nears an end of the longest one-side movement distance Sc. This is true when the second coil 15 moves in the Y direction.

Example 2

The electric power consumption of the first coil and the size of the voice coil motor were evaluated by the same magnetic field analysis simulation as in Example 1 except for changing the coil width, the longest movement distance and the magnetic pole width. The results are shown in Table 2.

(1) Electric Power Consumption of First Coil

Because the electric power consumption of the first coil increases in proportion to a ratio $I_{st}(=I_m/I_0)$, wherein $I_m$ is current necessary for generating the maximum thrust when reaching the longest movement distance (the longest stroke), and $I_0$ is current flowing when the first coil is at the center position, the electric power consumption of the first coil was evaluated by the ratio $I_{st}$. The evaluation standard is as follows:

Good $I_{st}$ is 1.0 or more and less than 1.20,

Fair $I_{st}$ is 1.20 or more and less than 1.25, and

Poor $I_{st}$ is 1.25 or more.

(2) Size of Voice Coil Motor

The size of the voice coil motor was evaluated by a product $f_s$ of the magnetic pole width Wm of the permanent magnet and the ratio $I_{st}$. The evaluation standard is as follows: The term "minimum value" means the minimum $f_s$ in each group with the same magnetic pole width Wb [5.7 for A-2 in Groups A (A-1 to A-5), 7.4 for B-2 in Groups B (B-1 to B-5), and 4.3 for C-2 in Groups C (C-1 to C-5)].

Good $f_s$ is the minimum value+15% or less,

Fair $f_s$ is the minimum value+more than 15 and 25% or less, and

Poor $f_s$ is the minimum value+more than 25%.

(3) Total Evaluation

Assigning two points to Good and one point to Fair in each evaluation, the total evaluation was made by the following standard on the premise that it was Poor when either one was Poor.

Excellent Three points or more,

Good Two points,

Fair One point, and

Poor At least one of the electric power consumption and the size was "Poor."

TABLE 2

| Analysis Number | Simulation Analysis Conditions | | | | Analysis Results | |
|---|---|---|---|---|---|---|
| | Wb (mm) | St (mm) | Wb + St (mm) | Wm (mm) | K | $I_{st}$ | $f_s$ |
| A-1 | 1.6 | 2.6 | 4.2 | 4.2 | 1.0 | 1.45 | 6.1 |
| A-2 | 1.6 | 2.6 | 4.2 | 4.6 | 1.1 | 1.23 | 5.7 |
| A-3 | 1.6 | 2.6 | 4.2 | 5.5 | 1.3 | 1.17 | 6.4 |
| A-4 | 1.6 | 2.6 | 4.2 | 6.3 | 1.5 | 1.11 | 7.0 |
| A-5 | 1.6 | 2.6 | 4.2 | 6.7 | 1.6 | 1.09 | 7.3 |
| B-1 | 1.6 | 4.0 | 5.6 | 5.6 | 1.0 | 1.38 | 7.7 |
| B-2 | 1.6 | 4.0 | 5.6 | 6.2 | 1.1 | 1.20 | 7.4 |
| B-3 | 1.6 | 4.0 | 5.6 | 7.2 | 1.3 | 1.14 | 8.2 |
| B-4 | 1.6 | 4.0 | 5.6 | 8.4 | 1.5 | 1.11 | 9.2 |
| B-5 | 1.6 | 4.0 | 5.6 | 9.8 | 1.6 | 1.10 | 10.8 |
| C-1 | 1.9 | 1.5 | 3.4 | 3.4 | 1.0 | 1.28 | 4.4 |
| C-2 | 1.9 | 1.5 | 3.4 | 3.7 | 1.1 | 1.16 | 4.3 |
| C-3 | 1.9 | 1.5 | 3.4 | 4.4 | 1.3 | 1.11 | 4.9 |
| C-4 | 1.9 | 1.5 | 3.4 | 5.1 | 1.5 | 1.10 | 5.3 |
| C-5 | 1.9 | 1.5 | 3.4 | 5.4 | 1.6 | 1.09 | 5.9 |

TABLE 2-continued

| Analysis Number | Evaluation | | |
| --- | --- | --- | --- |
| | Electric Power Consumption | Size | Total Evaluation |
| A-1 | Poor | Good | Poor |
| A-2 | Fair | Good | Excellent |
| A-3 | Good | Good | Excellent |
| A-4 | Good | Fair | Excellent |
| A-5 | Good | Poor | Poor |
| B-1 | Poor | Good | Poor |
| B-2 | Fair | Good | Excellent |
| B-3 | Good | Good | Excellent |
| B-4 | Good | Fair | Excellent |
| B-5 | Good | Poor | Poor |
| C-1 | Poor | Good | Poor |
| C-2 | Good | Good | Excellent |
| C-3 | Good | Good | Excellent |
| C-4 | Good | Fair | Excellent |
| C-5 | Good | Poor | Poor |

As is clear from Table 2, the electric power consumption increased by 28% or more at K=1 (Analysis Numbers A-1, B-1 and C-1), while there was small electric power consumption at K>1 (Analysis Numbers A-2 to A-5, B-2 to B-5, and C-2 to C-5), even when the longest movement distance St changed in a range of 1.5-4 mm with the effective conductor width Wb of the coil in a range of 1.6-1.9 mm. Taking the size of the voice coil motor into consideration, it is clear that practically useful, small voice coil motors with less electric power consumption can be obtained particularly at K in a range of 1.1-1.5 (Analysis Numbers A-2 to A-4, B-2 to B-4, and C-2 to C-4). When K was 1.6 (Analysis Numbers A-5, B-5 and C-5), there was a large product $f_s$ of the magnetic pole width Wm of the permanent magnet and the ratio $I_{st}$, and the voice coil motor had a large size, despite small electric power consumption. This reveals that the voice coil motor has poorer thrust-generating efficiency. The longest movement distance St as long as 4.0 mm (Analysis Number B-5) provided as wide magnetic pole width Wm as 9.8 mm, making $f_s$ more than 40% larger than the minimum value (Analysis Number B-2) in the same group, thereby decreasing the thrust-generating efficiency of the voice coil motor.

EFFECT OF THE INVENTION

Because the correction-lens-moving voice coil motor of the present invention comprises a permanent magnet with different magnetic poles adjacent to each other without a substantially unmagnetized neutral zone or a gap, such that the magnetic pole width of the permanent magnet meets predetermined conditions to the effective conductor width (width of a portion contributing to thrust generation) of a coil, and the maximum relative movement distance of the magnet unit and the coil, the magnet unit and the coil can make relative movement in a range having a magnetic flux density (for example, about 60% or more of the peak value) generating thrust sufficient for moving the correction lens in the magnetic gap. Accordingly, electric power consumption for the correction of hand movement can be reduced, extending a usable period of the battery. In addition, using a magnet unit comprising permanent magnets arranged on both opposing surfaces of a pair of yokes, a peak value of a magnetic flux density distribution in the magnetic gap can be made 0.5 T or more, further reducing the electric power consumption.

INDUSTRIAL APPLICABILITY

The anti-vibration device comprising the above voice coil motor can be mounted to any interchangeable lens units including wide-angle lens units (for example, having shorter focal distances than 40 mm) and telephoto lens units (for example, having longer focal distances than 85 mm). Also, when mounted to ultratelephoto lens units having longer focal distances than 400 mm, which have wide space for mounting the voice coil motor, there is a large magnetic pole width Wm meeting the condition of 1<Wm/(Wb+St)≤1.5, providing a larger correction range, and thus improved controlling of hand movement correction. Particularly in the interchangeable lens units having focal distances of 600 mm or more, the miniaturization of the correction-lens-moving voice coil motor is effective to reduce the barrel weight as much as possible, and the anti-vibration device comprising the voice coil motor of the present invention having the above advantages is suitable.

The anti-vibration device of the present invention is suitable for various optical apparatuses such as digital cameras, video cameras, binoculars, monitoring cameras, astronomical telescopes, etc.

What is claimed is:
1. An anti-vibration device comprising a correction lens, a frame supporting said correction lens and arranged in a holding member such that it can move in two directions perpendicular to the optical axis, and a pair of voice coil motors arranged in said holding member such that said frame can linearly move in said two directions;
  each voice coil motor comprising a magnet unit comprising a pair of yokes fixed to said holding member for providing a magnetic gap and a pair of permanent magnets fixed to a surface of each yoke opposing the magnetic gap, and a flat coreless coil disposed in said magnetic gap and fixed to said frame;
  each permanent magnet having different magnetic poles adjacent to each other along the movement direction of said coil on a surface opposing the magnetic gap;
  both permanent magnets having different magnetic poles opposing via said magnetic gap;
  wherein the flat coreless coil has an elongated circular shape comprising multi-layer winding having two linear portions parallel to each other and two semicircular portions connecting ends of the linear portions, and a coreless portion, and moves linearly in a direction perpendicular to the linear portions in a plane of the flat coreless coil;
  when a width of said permanent magnets in a movement direction is two times a width Wm of said magnetic poles, a width Wa of said flat coreless coil in the movement direction being smaller than the width 2Wm of said permanent magnets; and an effective conductor width Wb of said flat coreless coil, the magnetic pole width Wm of said permanent magnets and the longest movement distance St of said correction lens meeting the conditions of Wm=(Wb+St)×K, wherein K is a constant meeting 1<K≤1.5;
  the longest movement distance St of said correction lens being in a range of 1-4 mm; and
  a peak value of a magnetic flux density distribution in said magnetic gap being 0.5 T or more;
  whereby said correction lens is moved by said flat coreless coil to which current is supplied, to carry out the correction of hand movement.

2. An interchangeable lens unit comprising the anti-vibration device recited in claim 1, an imaging lens and a focus lens in a barrel.

3. An optical apparatus which comprises the anti-vibration device recited in claim 1, and forms an optical image on an image sensor through an optical system comprising an imaging lens, a focus lens and the correction lens.

* * * * *